United States Patent
Umezawa

(10) Patent No.: US 9,456,595 B2
(45) Date of Patent: Oct. 4, 2016

(54) FISHING REEL

(71) Applicant: Globeride, Inc., Higashikurume-shi (JP)

(72) Inventor: Yuuichi Umezawa, Tokyo (JP)

(73) Assignee: GLOBERIDE, INC., Higashikurume-shi (JP)

( * ) Notice: Subject to any disclaimer, the term of this patent is extended or adjusted under 35 U.S.C. 154(b) by 0 days.

(21) Appl. No.: 14/661,946

(22) Filed: Mar. 18, 2015

(65) Prior Publication Data

US 2015/0201596 A1 Jul. 23, 2015

Related U.S. Application Data

(63) Continuation of application No. PCT/JP2013/075320, filed on Sep. 19, 2013.

(30) Foreign Application Priority Data

Sep. 21, 2012 (JP) ................................ 2012-208395

(51) Int. Cl.
*A01K 89/01* (2006.01)
*A01K 89/00* (2006.01)

(52) U.S. Cl.
CPC ....... *A01K 89/003* (2013.01); *A01K 89/01918* (2015.05)

(58) Field of Classification Search
CPC .................. A01K 89/015; A01K 89/019125; A01K 89/01915
See application file for complete search history.

(56) References Cited

U.S. PATENT DOCUMENTS

| | | | |
|---|---|---|---|
| 3,111,287 A * | 11/1963 | Baenziger | A01K 89/015 242/236 |
| 3,171,609 A | 3/1965 | Baenziger | |
| 4,223,854 A | 9/1980 | Karlsson | |
| 4,747,560 A * | 5/1988 | Karlsson | A01K 89/015 242/260 |
| 5,833,155 A * | 11/1998 | Murayama | A01K 89/015 242/277 |
| 5,996,919 A * | 12/1999 | Murayama | A01K 89/015 242/261 |

(Continued)

FOREIGN PATENT DOCUMENTS

CN 101557704 A 10/2009
CN 201438835 U 4/2010

(Continued)

OTHER PUBLICATIONS

International Search Report mailed Dec. 3, 2013 for PCT/JP2013/075320 filed Sep. 19, 2013 with English Translation.

(Continued)

*Primary Examiner* — Emmanuel M Marcelo
(74) *Attorney, Agent, or Firm* — Oblon, McClelland, Maier & Neustadt, L.L.P.

(57) ABSTRACT

Provided is a fishing reel including a level wind device including a fishing line guide body (60) through which the fishing line (S) unreeled from the spool is threaded. The fishing line guide body (60) includes a fishing line threading section (60A) that forms an elongated opening (65) of which a height in a vertical direction is larger than a width in a left and right direction. The body (60) is rotated forward and the section (60A) stands up in the vertical direction during the unwinding of the fishing line. The body is rotated rearward and the section (60A) falls down during the winding of the fishing line, so that a fishing line guide section (70) comes into contact with the fishing line (S) threaded through the fishing line threading section (60A).

7 Claims, 13 Drawing Sheets

(56) References Cited

U.S. PATENT DOCUMENTS

| | | | |
|---|---|---|---|
| 6,409,113 B1* | 6/2002 | Hirayama | A01K 89/015 242/310 |
| 7,815,139 B2 | 10/2010 | Lee | |
| 8,714,470 B2 | 5/2014 | Toma | |
| 2004/0144877 A1* | 7/2004 | Kawasaki | A01K 89/015 242/278 |
| 2006/0237565 A1* | 10/2006 | Barker | A01K 89/0114 242/229 |
| 2009/0250541 A1* | 10/2009 | Tsutsumi | A01K 89/015 242/257 |
| 2010/0025513 A1 | 2/2010 | Lee | |
| 2012/0104135 A1* | 5/2012 | Toma | A01K 89/015 242/227 |

FOREIGN PATENT DOCUMENTS

| | | |
|---|---|---|
| CN | 101926313 A | 12/2010 |
| CN | 102428901 A | 5/2012 |
| CN | 102550511 A | 7/2012 |
| JP | 39-11030 B1 | 6/1964 |
| JP | 62-009810 Y2 | 1/1987 |
| JP | 1-130663 U | 9/1989 |
| JP | 1-130683 U | 9/1989 |
| JP | 08-242732 A | 9/1996 |
| JP | 3132197 U | 5/2007 |
| JP | 2009-207369 A | 9/2009 |
| JP | 2009-284777 A | 12/2009 |
| JP | 2012-070683 A | 4/2012 |

OTHER PUBLICATIONS

Office Action issued Oct. 22, 2015 in Japanese Patent Application No. 2013-194086 (with English translation).

Extended European Search Report issued on May 4, 2016 in Europe Application No. 13839549.6, filed Sep. 19, 2013 (in English).

Chinese Office Action issued on Oct. 19, 2015 in Ohinese Application No. 201380049190.X.

* cited by examiner

FISHING REEL

TECHNICAL FIELD

The present invention relates to a fishing reel including a fishing line guide body that guides and winds a fishing line on a spool in parallel and is provided between side plates in front of the spool.

BACKGROUND ART

In the related art, a double-bearing fishing reel is provided with a level wind device so as to uniformly wind a fishing line on a spool that is rotatably supported between left and right side plates. The level wind device includes a fishing line guide body that reciprocates in a left and right direction in front of the spool in conjunction with the winding operation of a handle that is rotatably provided on one side plate. Accordingly, when the fishing line is threaded through the fishing line guide body, the fishing line can be wound on the spool in parallel (for example, see Patent Document 1).

Incidentally, when a clutch mechanism is operated for separation in the fishing reel including the fishing line guide body so that the spool is switched to a free rotation state, the fishing line is unwound from the spool through the fishing line guide body. However, when the fishing line is unwound, a distance between the fishing line wound on the spool and the fishing line guide body is short and the guide width of the fishing line guide body for the fishing line is relatively small due to a necessity for guiding and winding the fishing line on the spool in parallel. For this reason, unwinding resistance applied to the fishing line is increased. As a result, there is a problem in that a flying distance of a terminal tackle at the time of casting is shortened, the unwinding speed of the fishing line is reduced, or the like.

For this reason, when the fishing line is unwound in Patent Document 2, the fishing line guide body, which includes an enlarged circular portion formed at an outer end (upper end) thereof, is rotated forward by a forward operation of an operation member, which is provided on the side plate opposite to the handle, to unwind the fishing line through the circular portion. Accordingly, unwinding resistance applied to the fishing line can be reduced.

CITATION LIST

Patent Document

Patent Document 1: JP-UM-B-62-9810
Patent Document 2: JP-B-39-11030

DISCLOSURE OF THE INVENTION

Problem to be Solved by the Invention

However, the upper portion of the fishing line guide body of Patent Document 2 forms the enlarged circular portion, but a lower portion thereof is narrow. Accordingly, when the fishing line wound on the spool is unwound through the fishing line guide body in a vertically undulating manner during an actual casting operation, the narrow lower portion of the fishing line guide body causes large unwinding resistance applied to the fishing line. That is, when the fishing line is unwound, the fishing line wound on the spool is unwound through the fishing line guide body while repeatedly coming into contact with (collides with) the narrow lower portion of the fishing line guide body many times in a vertically undulating manner. For this reason, unwinding resistance applied to the fishing line is increased. Eventually, the flying distance of a terminal tackle at the time of casting is shortened or the unwinding speed of the fishing line is reduced.

The invention has been made while focusing on the above-mentioned problems and an object of the invention is to provide a fishing reel provided with a fishing line guide body that can effectively reduce unwinding resistance applied to a fishing line when the fishing line is unwound from a spool in a vertically undulating manner.

Means for Solving Problem

To achieve the above-mentioned object, the invention provides a fishing reel including: a spool that is rotatably supported between left and right side plates of a reel body; and a level wind device including a fishing line guide body through which a fishing line unreeled from the spool is threaded and which reciprocates between the left and right side plates in front of the spool in conjunction with the rotation of a handle. The fishing line guide body includes a fishing line threading section that forms an elongated opening of which a height in a vertical direction is larger than a width in a left and right direction. A fishing line guide section, which is formed so as to be narrower than the fishing line threading section and guides the fishing line to the spool by coming into contact with the fishing line, is provided at a portion, which is close to the spool, of an upper wall of the fishing line threading section. The fishing line guide body is adapted to be rotatable in a front and rear direction. The fishing line guide body is rotated forward and the fishing line threading section stands up in the vertical direction during the unwinding of the fishing line. The fishing line guide body is rotated rearward and the fishing line threading section falls down during the winding of the fishing line, so that the fishing line guide section comes into contact with the fishing line threaded through the fishing line threading section.

According to the fishing reel having the above-mentioned structure, since the fishing line guide body is rotated forward and the fishing line threading section stands up in the vertical direction during the unwinding of the fishing line, the elongated opening of the fishing line threading section extends in front of the spool so as to be elongated in the vertical direction and wider than the fishing line guide section. Accordingly, it is possible to reduce contact resistance applied to the fishing line that is unwound in a vertically undulating manner, contact resistance applied to the fishing line that is unwound while moving in the left and right direction, and the like. As a result, it is possible to improve the flying distance of a terminal tackle at the time of casting and to improve the unwinding speed of the fishing line. On the other hand, since the fishing line guide body is rotated rearward and the fishing line threading section falls down during the winding of the fishing line, the fishing line guide section comes into contact with the fishing line that is threaded through the fishing line threading section. Accordingly, it is possible to guide the fishing line to the spool via the narrow fishing line guide section. As a result, it is possible to obtain a state in which the fishing line is uniformly wound well in parallel.

Meanwhile, in the above-mentioned structure, "the height in the vertical direction" is the dimension of the opening in the vertical direction when the fishing line threading section stands up during the unwinding of the fishing line. It is preferable that "the height in the vertical direction" be a dimension not allowing interference to occur between the fishing line that is unwound from the spool in a vertically undulating manner during the unwinding of the fishing line and the wall surface of the fishing line threading section defining the opening.

Effect of the Invention

According to the invention, there is provided a fishing reel provided with a fishing line guide body that can effectively reduce unwinding resistance applied to a fishing line when the fishing line is unwound from a spool in a vertically undulating manner.

MODE(S) FOR CARRYING OUT THE INVENTION

A fishing reel according to an embodiment of the invention will be described below with reference to the drawings. Meanwhile, in the following description, a front and rear direction, a left and right direction, and a vertical direction are defined as directions that are indicated in FIGS. 1 and 2 by arrows.

Figure 1:
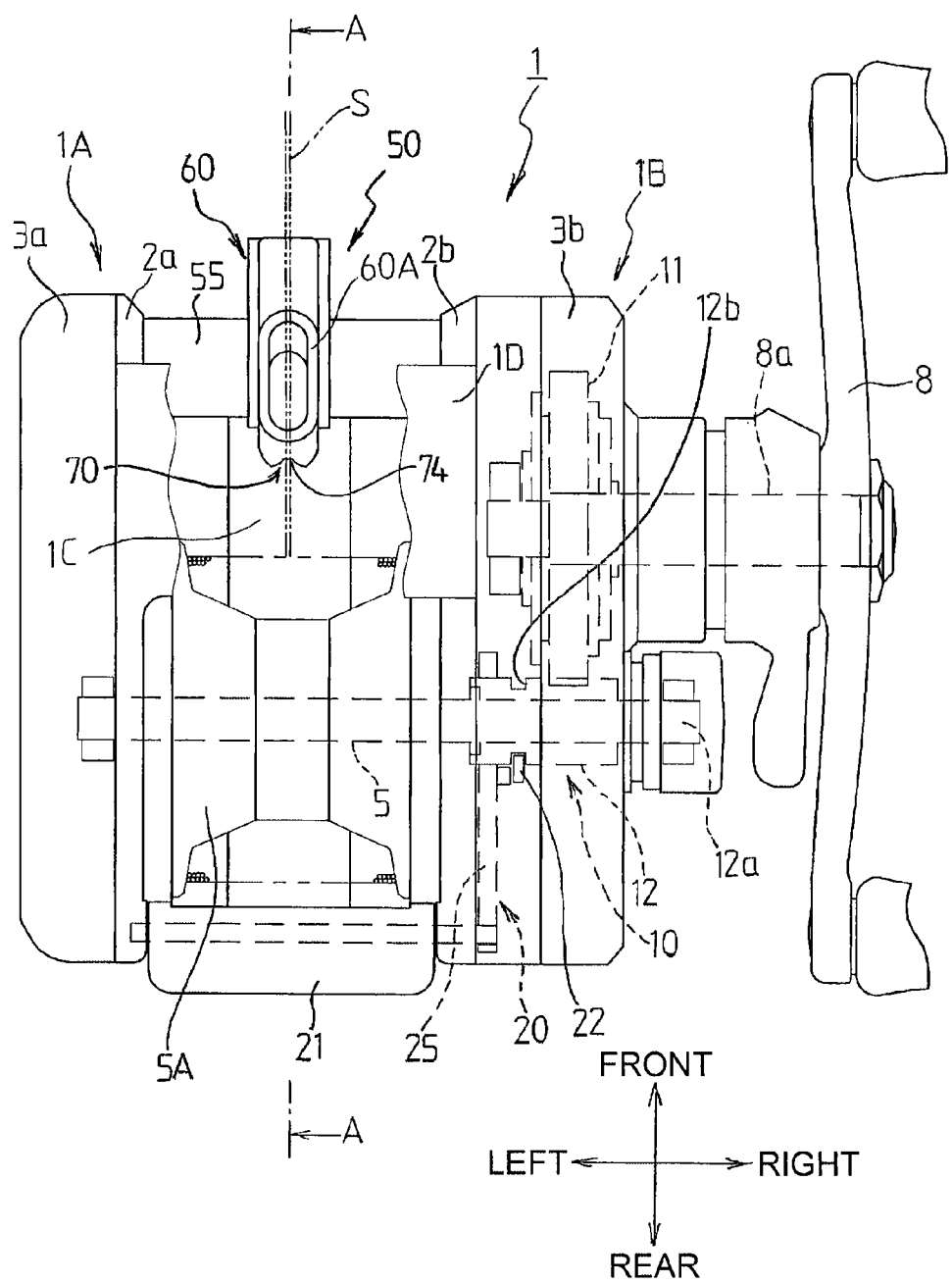
FIG. 1 is a plan view illustrating a fishing reel according to the invention, in which a fishing line guide body is exposed.
Figure 2:
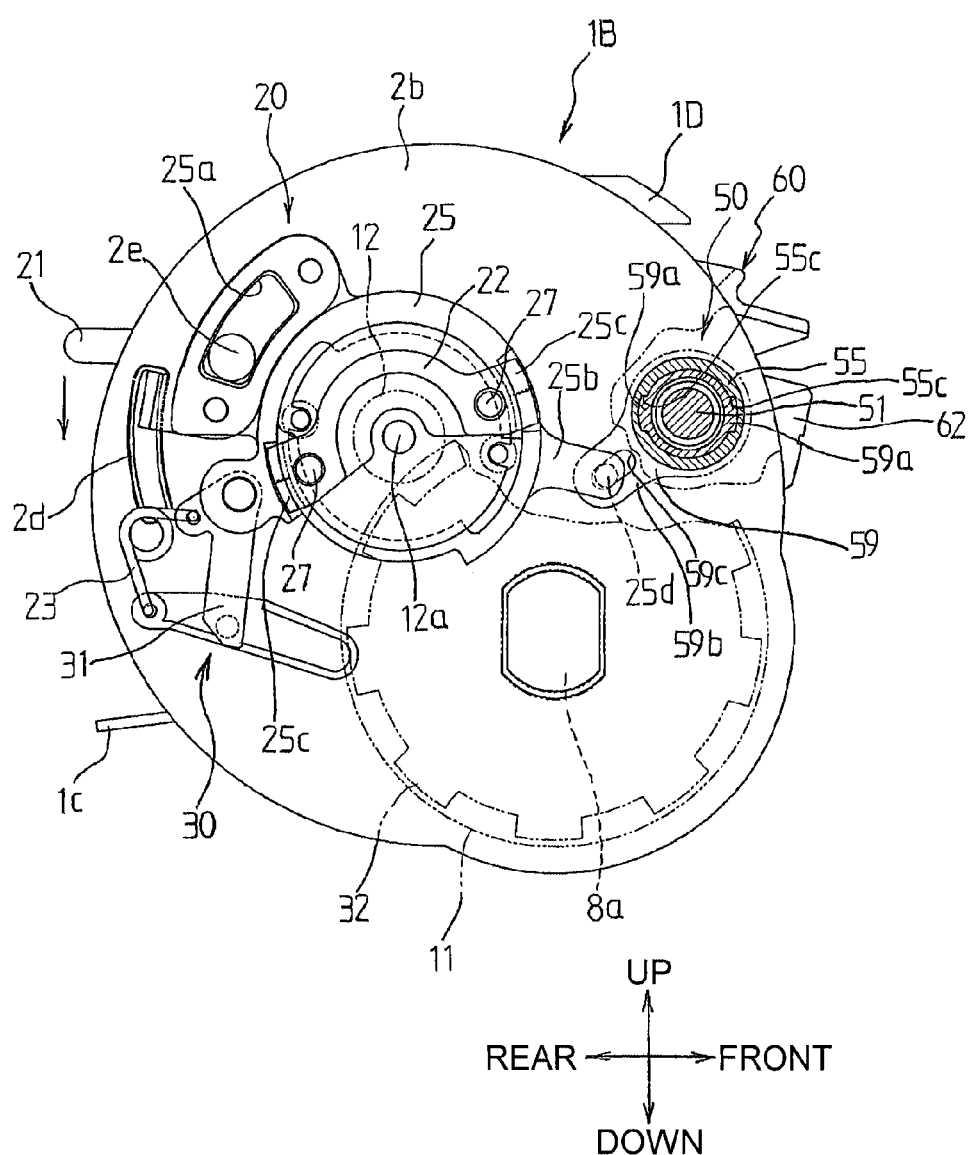
FIG. 2 is a side view illustrating the structure of a power transmitting portion of a clutch mechanism in the fishing reel illustrated in FIG. 1 (clutch ON state)

As particularly illustrated in FIG. 1, the fishing reel according to this embodiment includes a reel body 1 provided with left and right side plates 1A and 1B of which left and right frames 2a and 2b are covered with left and right covers 3a and 3b. A reel leg 1C, which is positioned between the left and right side plates 1A and 1B and is mounted on a fishing rod (not illustrated), is formed integrally with the reel body 1. Further, a spool shaft 5 is rotatably supported via a bearing between the left and right frames 2a and 2b, and a spool 5A on which a fishing line S is wound is integrally fixed to the spool shaft 5. Furthermore, a thumb rest 1D on which a finger can be placed is provided between the left and right side plates 1A and 1B on the upper side of the spool 5A.

In this embodiment, a handle 8 for rotationally driving the spool 5A is mounted on the right side plate 1B. A known drive force transmission mechanism 10, which transmits a rotational driving force of the handle 8 to the spool shaft 5, is provided in a space between the right frame 2b and the right cover 3b. Further, a known clutch mechanism 20, which switches the spool shaft 5 between a power transmitting state and a power cut-off state, is provided between the right frame 2b and the right cover 3b. The clutch mechanism 20 is adapted to be switched to a clutch OFF state (the power cut-off state, also a fishing line unwinding state) from a clutch ON state (the power transmitting state, also a fishing line winding state) by pushing down a clutch switching operation member (hereinafter, referred to as an operation member) 21 provided between the left and right side plates 1A and 1B in the rear of the spool 5A. Incidentally, returning to the clutch ON state from the clutch OFF state can be achieved by rotating the handle 8, using an automatic return mechanism 30 (see FIG. 2) to be described below.

Further, a level wind device 50 is provided between the left and right side plates 1A and 1B on the fishing line unreeled-direction side of the spool 5A. The level wind device 50 is adapted to allow a fishing line guide body 60, through which the fishing line S is threaded, to reciprocate in the left and right direction by rotating the handle 8. Accordingly, the level wind device 50 has a function to uniformly wind the fishing line S on the spool 5A while spooling the fishing line S.

The drive force transmission mechanism 10 includes a drive gear 11 associated with a drag mechanism, and a pinion 12 to be engaged with the drive gear 11. The drive gear 11 is rotatably mounted on a handle shaft 8a to which the handle 8 is fixed. The pinion 12 is disposed coaxially with the spool shaft 5, and is movable along a pinion shaft 12a (or the spool shaft 5) in the axial direction. Further, a circumferential groove 12b is formed on an outer periphery of the pinion 12 and the circumferential groove 12b is engaged with a yoke 22 of the clutch mechanism 20 to be described below, so that the pinion 12 is moved in the axial direction. That is, when the pinion 12 is moved in the axial direction, the pinion 12 is engaged with or disengaged from the spool shaft 5. As a result, the clutch mechanism is switched to the power transmitting state (clutch ON) or the power cut-off state (clutch OFF).

Figure 3:
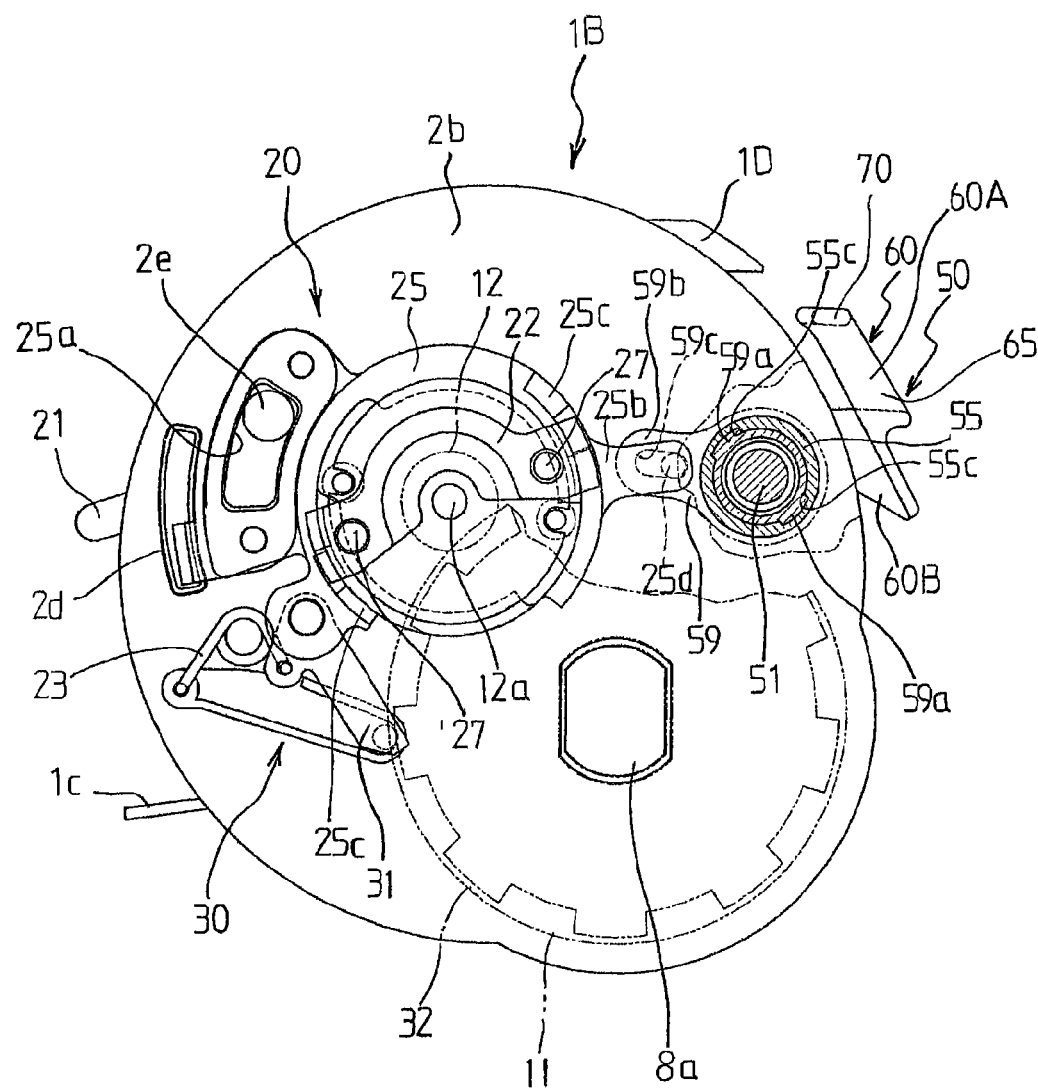
FIG. 3 is another side view illustrating the structure of the power transmitting portion of the clutch mechanism in the fishing reel illustrated in FIG. 1 (clutch OFF state)
Figure 4:
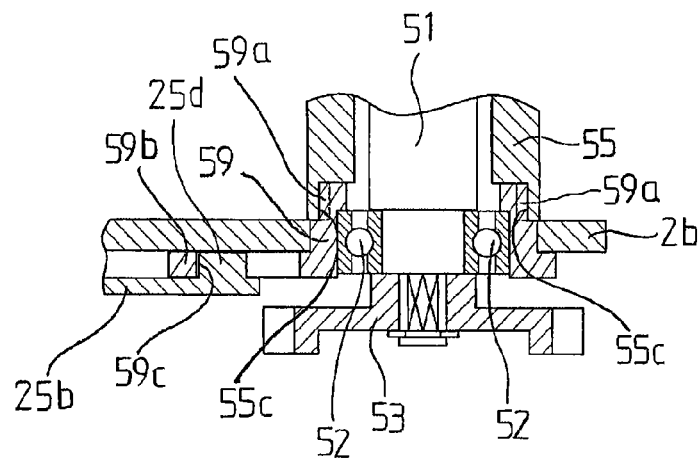
FIG. 4 is a cross-sectional view illustrating the structure of a connected portion between a clutch plate and a rotary plate that rotates the fishing line guide body.

The clutch mechanism 20 includes a clutch plate 25. The clutch plate 25 is supported so as to be rotatable relative to the right frame 2b, and is switched and held between the power transmitting state (clutch ON state) illustrated in FIG. 2 and the power cut-off state (clutch OFF state) illustrated in FIG. 3 by a switching spring 23. As illustrated in FIGS. 2 and 3, the clutch plate 25 is connected to the operation member 21 via a connecting hole 2d, which is formed vertically on the right frame 2b, and a pin 2e, which is formed on the right frame 2b so as to protrude, is inserted into a long hole 25a formed on the clutch plate 25. Accordingly, the rotational drive of the clutch plate 25 is guided.

As known, a pair of cam faces 25c, which can be engaged with the yoke 22 engaged with the circumferential groove 12b of the pinion 12, is formed on the surface of the clutch plate 25. Tip sides of the yoke 22 are held by support pins 27 protruding from the right frame 2b, and the yoke 22 is continuously biased to the clutch plate 25 side by a spring member (not illustrated) mounted on each support pin 27. Meanwhile, FIG. 2 illustrates a state in which the yoke 22 is biased to the clutch plate 25 side by the spring member. At this point, the pinion 12 is engaged with an engagement section formed at the end portion of the spool shaft 5, so that the clutch mechanism is in the clutch ON state.

When the operation member 21 is pushed down in a direction indicated by an arrow of FIG. 2, the clutch plate 25 is rotated counterclockwise and disengages the pinion 12 from the engagement section, which is formed at the end portion of the spool shaft 5, via the cam face 25c and the yoke 22. Accordingly, the clutch mechanism is switched to the clutch OFF state as illustrated in FIG. 3. Meanwhile, this state is maintained by the switching spring 23.

Further, the clutch plate 25 is provided with the automatic return mechanism 30 that switches the clutch to the ON state from the OFF state. The automatic return mechanism 30 includes a kick member 31 that is formed integrally with the clutch plate 25, and a ratchet 32 that is unrotatably fixed to the handle shaft 8a. The kick member 31 is arranged and adapted so as to enter the inside of a rotating locus of the ratchet 32 as illustrated in FIG. 3 when the clutch mechanism is switched to the OFF state from the ON state. Accordingly, when the handle 8 is operated for winding in the clutch OFF state, the kick member 31 is kicked by the rotation of the ratchet 32 and the clutch plate 25 is automatically returned to the position of the clutch ON state. The return state of the clutch plate is maintained by the spring force of the switching spring 23 again. Meanwhile, the return of the clutch can also be performed by pushing up the operation member 21.

The level wind device 50 is disposed between the left and right side plates 1A and 1B in front of the spool 5A. The structure of the level wind device 50 will be described below with reference to all of FIGS. 4 to 7.

The level wind device 50 is provided with the fishing line guide body 60 including a fishing line threading section 60A through which a fishing line S wound on the spool 5A is threaded. The fishing line guide body 60 is rotatably supported between the left and right side plates 1A and 1B via a bearing 52 (see FIG. 4), and is reciprocated in the left and right direction by a screw shaft (worm shaft) 51 that is rotatably driven through the drive force transmission mechanism 10. That is, an input gear 53, which is disposed adjacent to the drive gear 11 mounted on the handle shaft 8a and is engaged with a connection gear (not illustrated) rotating integrally with the handle shaft 8a, is provided on the right frame 2b side of the screw shaft 51. The screw shaft 51 is rotationally driven in synchronization with the rotational drive of the handle 8 via the connection gear and the input gear 53.

The screw shaft 51 is housed in a tubular body (cylindrical body) 55 that is rotatably held between the left and right side plates 1A and 1B. A long hole 55a, which extends in the axial direction, is formed on an outer surface of the tubular body 55, and a spiral groove 51a formed on the surface of the screw shaft 51 is partially exposed to the outside in the axial direction. Further, the fishing line guide body 60 through which the fishing line S is threaded includes the fishing line threading section 60A and a holding section 60B that are formed integrally, and the holding section 60B is disposed and formed so as to surround the tubular body 55.

Figure 5:
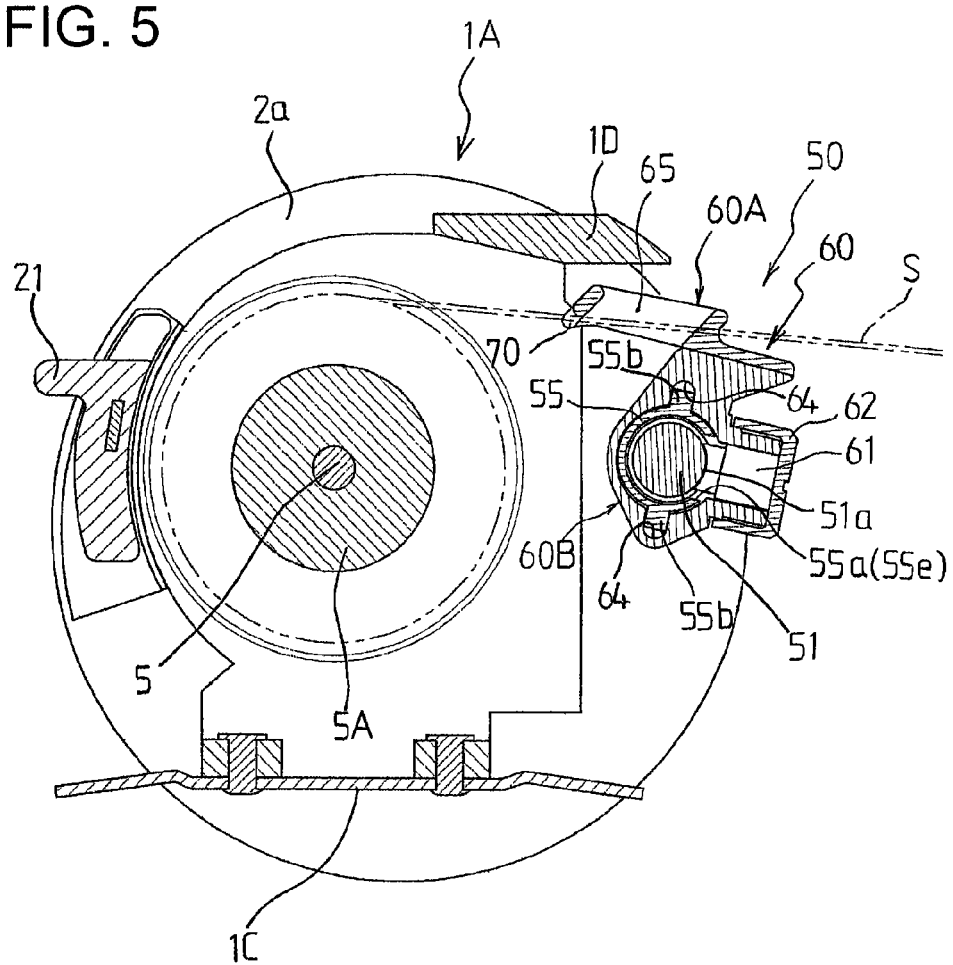
FIG. 5 is a cross-sectional view of the fishing reel illustrated in FIG. 1 taken along a line A-A, illustrating a case where the fishing line guide body is in a fishing line winding state (clutch ON state)
Figure 6:
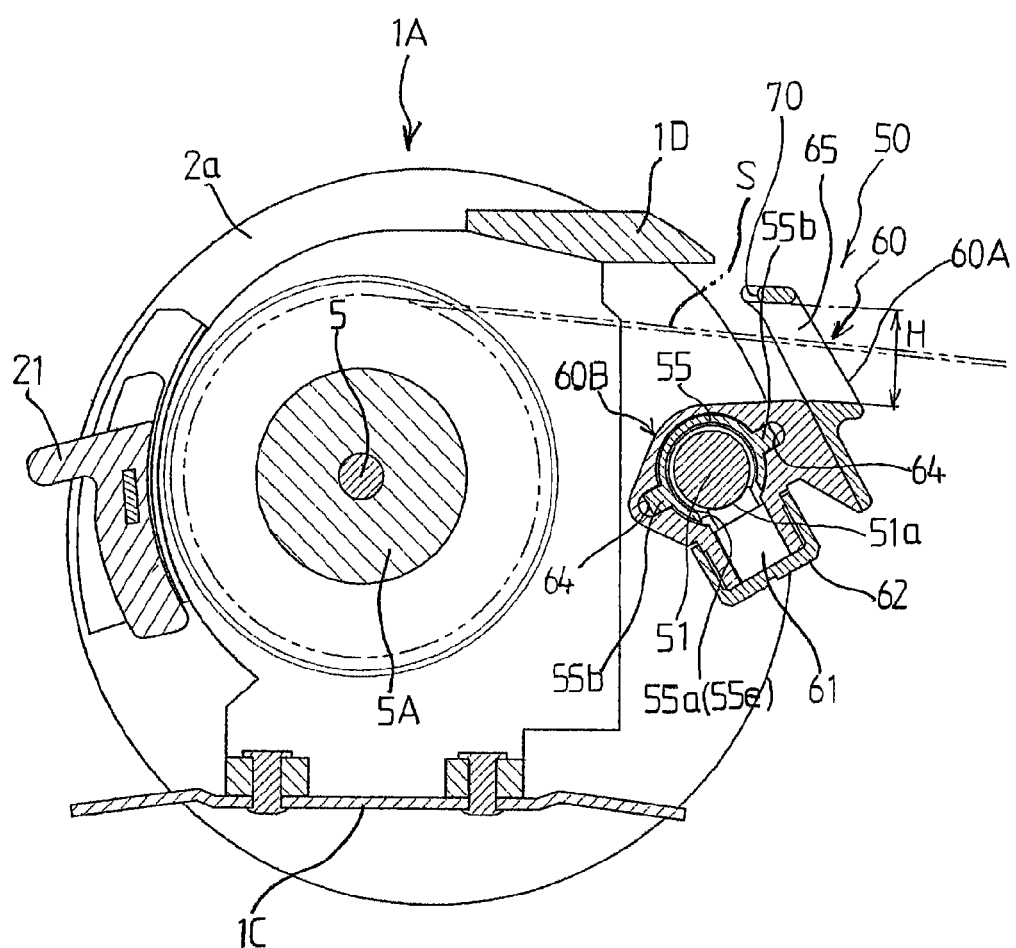
FIG. 6 is another cross-sectional view of the fishing reel illustrated in FIG. 1 taken along the line A-A, illustrating a case where the fishing line guide body is in a fishing line unwinding state (clutch OFF state)

The holding section 60B holds a slidable member 61 that is provided therein and is engaged with the spiral groove 51a through the long hole 55a. The slidable member 61 is fixed to the holding section 60B by a cap nut 62. Further, the fishing line guide body 60 is prevented from rotating about the tubular body 55 while being moved in the axial direction with the rotation of the screw shaft 51 by means of the engagement relationship between the spiral groove 51a and the slidable member 61. In the structure of this embodiment, rotation stoppers 55b extending in the axial direction are formed on an outer periphery of the tubular body 55, and rotation is stopped through the engagement between engagement sections 64 of the holding section 60B and the rotation stoppers 55b. Specifically, the rotation stoppers 55b are formed as protrusions extending in the axial direction on the outer periphery of the tubular body 55 (a pair of protrusions are provided at an interval of 180° as illustrated in FIGS. 5 and 6), and the engagement sections 64 are formed as recesses to be engaged with such protrusions.

As described above, since the rotation stoppers 55b are formed integrally with the tubular body 55 housing the screw shaft 51, it is not necessary to provide a guide shaft for stopping the rotation of the fishing line guide body 60 as in the related art. As a result, the structure of the level wind device 50 can be simplified.

Further, when the screw shaft 51 is rotationally driven, the fishing line guide body 60 is driven so as to reciprocate between the left and right side plates 1A and 1B via the slidable member 61. In this embodiment, the fishing line guide body 60 according to the present embodiment is rotatably formed so as to be switched between the fishing line winding state and the fishing line unwinding state in conjunction with the ON/OFF state of the above-mentioned clutch mechanism 20. In this case, the fishing line guide body 60 is rotationally driven through the rotational drive of the tubular body 55.

Here, a power transmission path from the clutch mechanism 20 to the tubular body 55 will be described specifically.

A protruding piece 25b protruding to the front side of the reel body 1 is formed on the clutch plate 25, and an engagement protrusion 25d, which protrudes toward the right frame 2b side, is formed integrally with the tip of the protruding piece 25b. On the other hand, a rotary plate 59 is held at a portion, which supports the screw shaft 51, of the right frame 2b (see FIG. 4), and the tubular body 55 is unrotatably fixed to the rotary plate 59 on the inner surface side of the right frame 2b. That is, protrusions 59a, which protrude in a radial direction, are formed on the rotary plate 59 and recesses 55c, which are formed at an end portion of the tubular body 55, are fitted to the protrusions 59a.

Accordingly, both the protrusion 59a and the recess 55c are fixed to each other (rotatable integrally with each other) on the inner surface side of the right frame 2b.

The rotary plate 59 is rotatably supported between the right frame 2b and an outer ring of the bearing 52 that rotatably supports the screw shaft 51. A connecting piece 59b, which is engaged with the protruding piece 25b of the clutch plate 25, is formed on the rotary plate 59 along an outer surface of the right frame 2b. Further, a long hole 59c is formed on the connecting piece 59b, and the engagement protrusion 25d of the protruding piece 25b of the clutch plate 25 is loosely inserted into the long hole 59c. As a result, the rotary plate 59 is rotated about the axis of the screw shaft 51 along with the rotation of the clutch plate 25 as illustrated in FIGS. 2 and 3. Therefore, the rotary plate 59 is switched between two positions together with the clutch plate 25 that is switched and held between the fishing line winding state and the fishing line unwinding state by the switching spring 23.

The tubular body 55 is rotationally driven through the rotary plate 59, so that the fishing line guide body 60 is rotationally driven in the front and rear direction in front of the spool 5A. That is, the fishing line guide body 60 is rotated forward and the fishing line threading section 60A stands up in the vertical direction in the fishing line unwinding state (during the unwinding of the fishing line) (see FIG. 6). The fishing line guide body 60 is rotated rearward and the fishing line threading section 60A falls down in the fishing line winding state (during the winding of the fishing line), so that a fishing line guide section 70 to be described below comes into contact with the fishing line S threaded through the fishing line threading section 60A (see FIGS. 5 and 7). Here, the structure of the fishing line threading section 60A of the fishing line guide body 60 will be described specifically.

Figure 7:
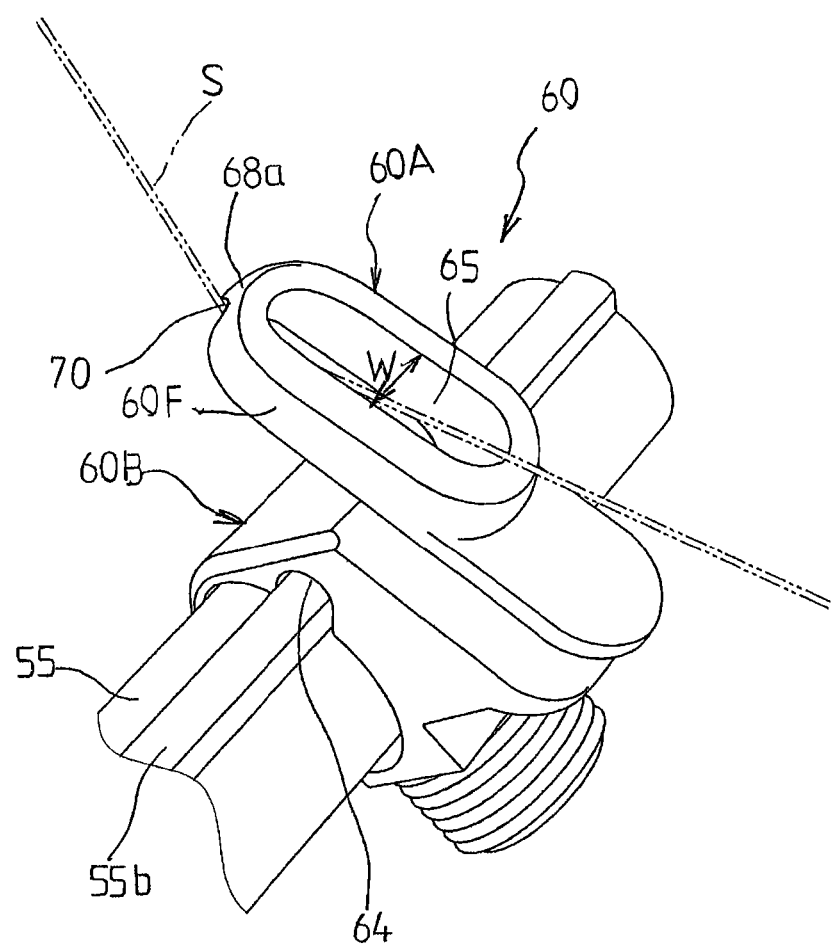
FIG. 7 is an enlarged perspective view of the fishing line guide body (clutch ON state)

The fishing line threading section 60A is a portion through which the fishing line S to be unwound from the spool 5A is threaded, and is formed as a frame body 60F made of a plated hard material having small resistance against a fishing line, such as SUS or titanium. The fishing line threading section 60A is formed integrally with the separate holding section 60B as illustrated in FIG. 7. Specifically, the fishing line threading section 60A forms an elongated opening 65 of which a height H in the vertical direction (see FIG. 6; the dimension of the opening 65 in the vertical direction when the fishing line threading section 60A stands up in the fishing line unwinding state illustrated in FIG. 6) is larger than a width W (see FIG. 7) in the left and right direction. Meanwhile, in this embodiment, the frame body 60F defining the opening 65 is inclined with respect to the front and rear direction (in a shape in which the frame body gradually rises toward the rear side) in side view in the fishing line unwinding state (see FIG. 6).

It is preferable that the opening 65 extending in the vertical direction extends vertically over a range in which the entire fishing line winding region of the spool 5A can be visually recognized through the opening 65 in front view in the fishing line unwinding state illustrated in FIG. 6. Specifically, for example, the dimension H of the opening 65 in the vertical direction is in the range of 8 to 12 mm, and is, for example, preferably two to five times the width W.

Figure 8A:
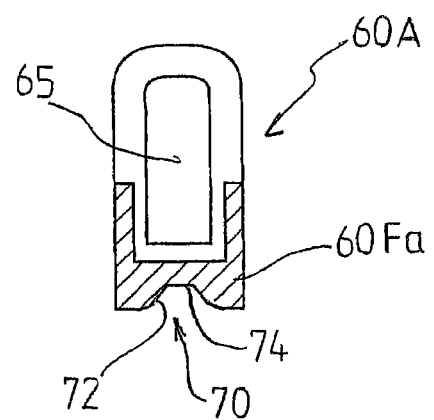
FIGS. 8A-8C are plan views illustrating modifications of a fishing line guide section.

Further, a fishing line guide section 70 is formed at a portion, which is close to the spool, of an upper wall 68a of the fishing line threading section 60A (a surface portion of the upper end portion of the frame body 60F facing the spool 5A). The fishing line guide section 70 is formed so as to be narrower than the opening 65 of the fishing line threading section 60A, and can guide the fishing line S to the spool 5A by coming into contact with the fishing line S. The fishing line guide section 70 includes a holding groove 74 and tapered surfaces 72 as clearly illustrated in FIG. 8A. The holding groove 74 holds the fishing line S, which is threaded through the opening 65 of the fishing line threading section 60A, in the left and right direction. The tapered surfaces 72 guide the fishing line S, which extends through the fishing line threading section 60A, to the holding groove 74.

When the fishing line guide body 60 is rotated to the fishing line winding state (the state illustrated in FIGS. 2, 5, and 7) from the fishing line unwinding state (the state illustrated in FIGS. 3 and 6), the fishing line guide section 70 is positioned so as to come into contact with the fishing line S, which extends toward the spool 5A through the opening 65, from above. Accordingly, the fishing line guide section 70 holds the fishing line S in the left and right direction and regulates the fishing line S so that the fishing line S does not deviate. That is, the fishing line guide section 70 has a function to stably wind the fishing line S on the spool 5A in parallel (a function to improve the spooled condition) by preventing the deviation of the fishing line S, which is threaded through the fishing line guide section, in the left and right direction.

Figure 8B:
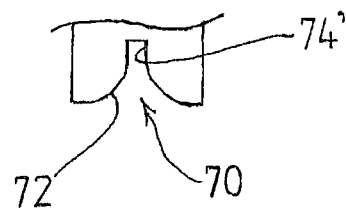
Figure 8C:
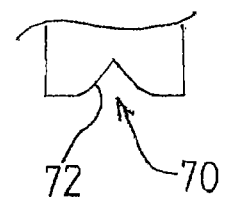

Meanwhile, in this embodiment, it is preferable that a portion 60Fa (a portion illustrated in FIG. 8A by diagonal hatching) of the frame body 60F forming the fishing line guide section 70 is made of metal (for example, aluminum, a copper alloy, or the like) and is subjected to a surface treatment (alumite treatment, plating, or the like) for improving wear resistance. Accordingly, even though the fishing line comes into contact with the portion 60Fa during the unwinding or winding of the fishing line, it is possible to prevent the portion 60Fa from being cut and to further reduce contact resistance. Further, the holding groove 74 may be a holding groove 74' that further extends vertically from the tapered surfaces 72 so as to be narrow as illustrated in FIG. 8B, or the fishing line guide section 70 does not include a holding groove and may have a V-shaped cross-section in which tapered surfaces 72 converge on one point at an inner portion thereof as illustrated in FIG. 8C.

Next, the function and the effect of the fishing reel formed as described above will be described.

When the operation member 21 positioned in the rear of the spool 5A is pushed down in the clutch ON state illustrated in FIGS. 2 and 5, the clutch plate 25 forming the clutch mechanism 20 is rotated counterclockwise and held in the state illustrated in FIG. 3 by the switching spring 23. At this point, the cam face 25c formed on the surface of the clutch plate 25 shifts the yoke 22 in the axial direction and disengages the pinion 12 from the spool shaft 5 (clutch OFF state). Further, the rotary plate 59 is rotated about the axis of the screw shaft 51 in conjunction with the rotation of the clutch plate 25 that is caused by this operation, and the tubular body 55 unrotatably fixed to the rotary plate 59 is rotated to the position illustrated in FIG. 3 (FIG. 6) from the position illustrated in FIG. 2 (FIG. 5).

Therefore, since the fishing line guide body 60 is held by the tubular body 55, the fishing line guide body 60 is rotated forward as illustrated in FIGS. 3 and 6 from the state illustrated in FIGS. 2, 5, and 7. That is, the fishing line threading section 60A is rotated forward from the falling-down state, and stands up in the vertical direction. Then, the fishing line guide body 60 rotated as described above is in a state in which the spool 5A can be freely rotated (fishing line unwinding state), and the regulation of the fishing line S threaded through the fishing line guide section 70 is released. Accordingly, the fishing line S is allowed to be unwound in a vertically, leftward, and rightward undulating manner.

Since the fishing line guide body 60 is rotated in front of the spool 5A in the state illustrated in FIGS. 3 and 6 and the opening 65 is elongated in the vertical direction and is wider than the fishing line guide section 70 even though the fishing line S is unwound by a casting operation or the like in the state in which the spool 5A can be freely rotated, contact resistance applied to the fishing line from the inner surface of the opening 65 is small. For this reason, a flying distance of a terminal tackle is not reduced. That is, it is possible to reduce unwinding resistance that is applied to the fishing line from the fishing line guide body 60 during the unwinding of the fishing line.

Further, when the handle 8 is operated for winding in order to return the clutch mechanism 20 to the ON state, the clutch plate 25 is automatically returned to the position illustrated in FIG. 2 by the automatic return mechanism 30. In response to the return of the clutch plate 25 to the ON state, the tubular body 55 is rotated to the state illustrated in FIGS. 2 and 5 via the rotary plate 59, and the fishing line guide body 60 is switched to the position illustrated in FIGS. 2, 5, and 7. At this time, the fishing line guide section 70 to be rotated comes into contact with and is pressed against the fishing line S, which extends toward the spool 5A through the opening 65, from above. In this case, the fishing line S is easily guided to the holding groove 74 along the tapered surfaces 72 of the fishing line guide section 70. Accordingly, as illustrated in FIGS. 5 and 7, in this fishing line winding state, the fishing line S is held in the left and right direction by the fishing line guide section 70 and does not deviate from the fishing line guide section 70.

After that, when the handle 8 is operated for winding, the screw shaft 51 of the level wind device 50 is rotationally driven via the connection gear provided on the handle shaft 8a and the input gear 53 engaged with the connection gear. When the screw shaft 51 is rotationally driven, the fishing line guide body 60 is reciprocated in the left and right direction along the tubular body 55 via the slidable member 61 that is engaged with the spiral groove 51a formed on the outer peripheral surface of the screw shaft 51. In this case, since the rotation stoppers 55b extending in the axial direction are formed on the outer periphery of the tubular body 55, the fishing line guide body 60 is driven so as to reciprocate in the left and right direction without rotating about the shaft. Accordingly, the fishing line S is stably wound on the spool 5A in parallel by the fishing line guide section 70 that is narrow in the left and right direction.

As described above, according to the fishing reel of this embodiment, since the fishing line guide body 60 is rotated forward and the fishing line threading section 60A stands up in the vertical direction during the unwinding of the fishing line, the elongated opening 65 of the fishing line threading section 60A extends in front of the spool 5A so as to be elongated in the vertical direction and wider than the fishing line guide section 70. Accordingly, it is possible to reduce contact resistance applied to the fishing line S that is unwound in a vertically undulating manner, contact resistance applied to the fishing line that is unwound while moving in the left and right direction, and the like. As a result, it is possible to improve the flying distance of a terminal tackle at the time of casting and to improve the unwinding speed of the fishing line. On the other hand, since the fishing line guide body 60 is rotated rearward and the fishing line threading section 60A falls down during the winding of the fishing line, the fishing line guide section 70 comes into contact with the fishing line S that is threaded through the fishing line threading section 60A. Accordingly, it is possible to guide the fishing line S to the spool 5A via the narrow fishing line guide section 70. As a result, it is possible to obtain a state in which the fishing line is uniformly wound well in parallel.

Figure 9A:
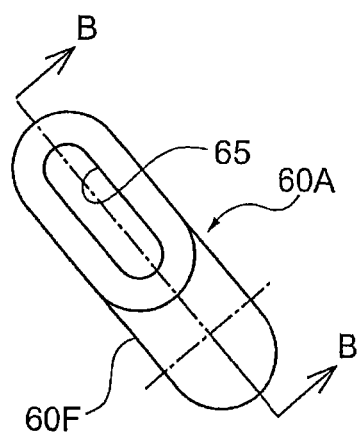
FIG. 9A illustrates another modification of the fishing line guide section, and is a front view of the fishing line guide body.
Figure 9B:
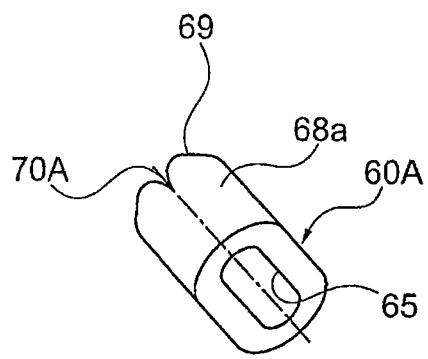
FIG. 9B illustrates another modification of the fishing line guide section, and is a perspective view of a fishing line threading section that is seen from above.
Figure 9C:
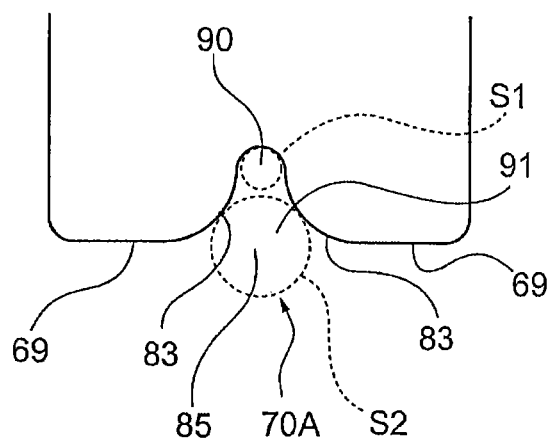
FIG. 9C illustrates another modification of the fishing line guide section, and is an enlarged view of the fishing line guide section.
Figure 10A:
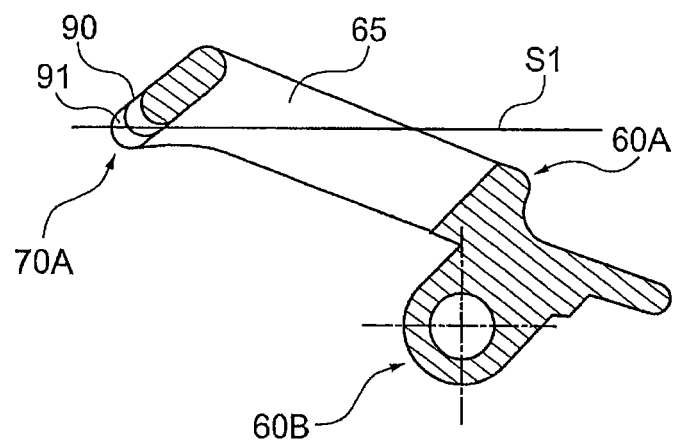
FIG. 10A is a cross-sectional view taken along a line B-B of FIG. 9A and illustrating a state in which a fishing line not accompanied by a knot and the like passes through the fishing line guide section.
Figure 10B:
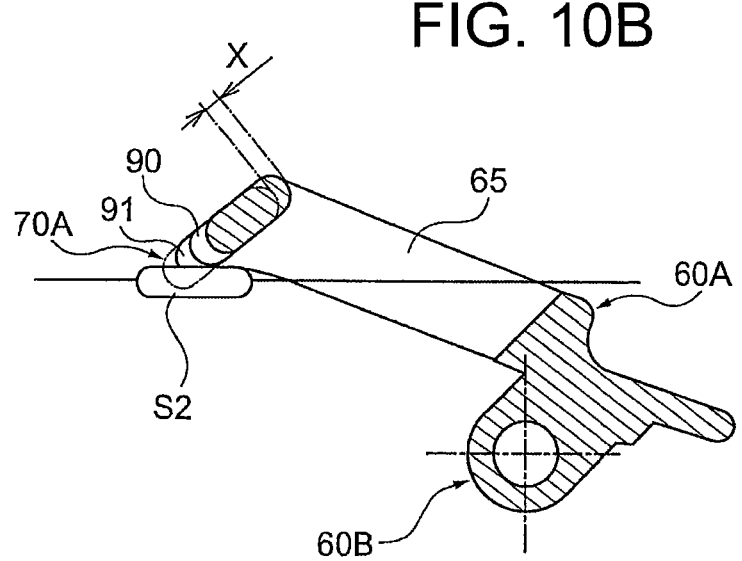
FIG. 10B is a cross-sectional view taken along the line B-B of FIG. 9A and illustrating a state in which a fishing line accompanied by a knot and the like passes through the fishing line guide section.
Figure 11:
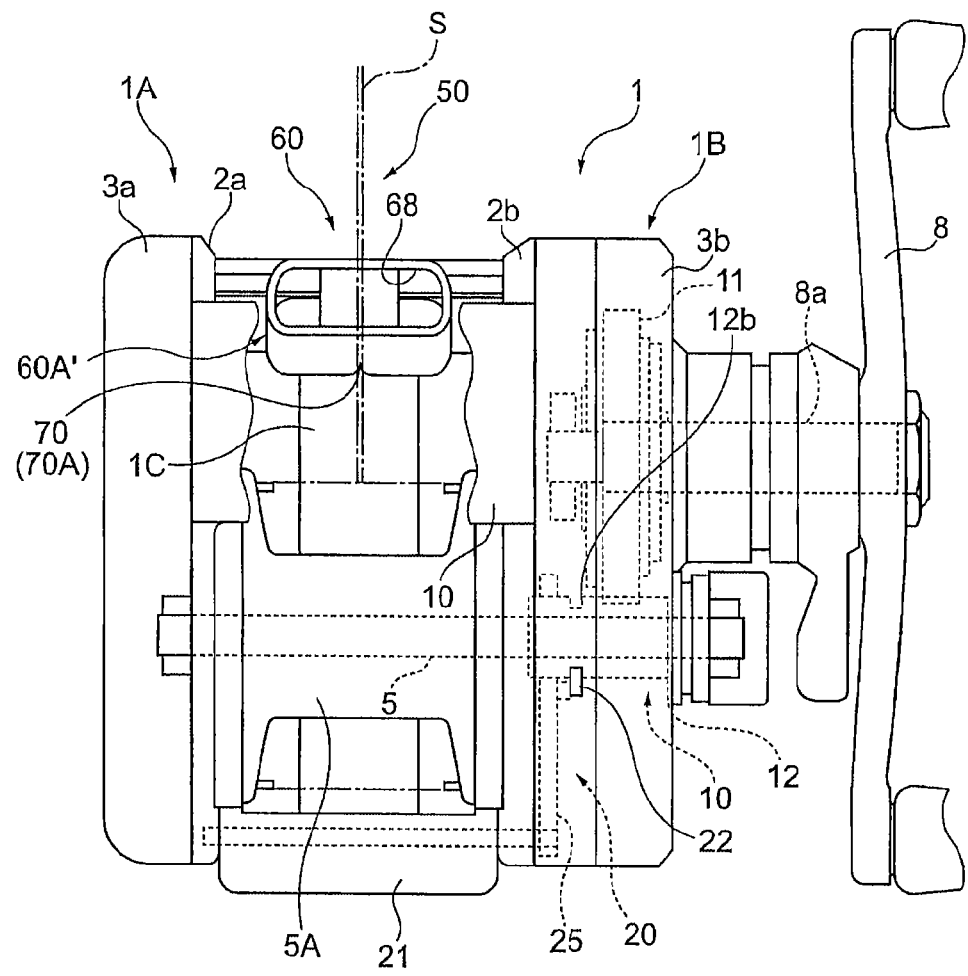
FIG. 11 is a plan view of a fishing reel including a fishing line guide body that includes a fishing line threading section forming a wide opening expanding in the left and right direction.
Figure 12:
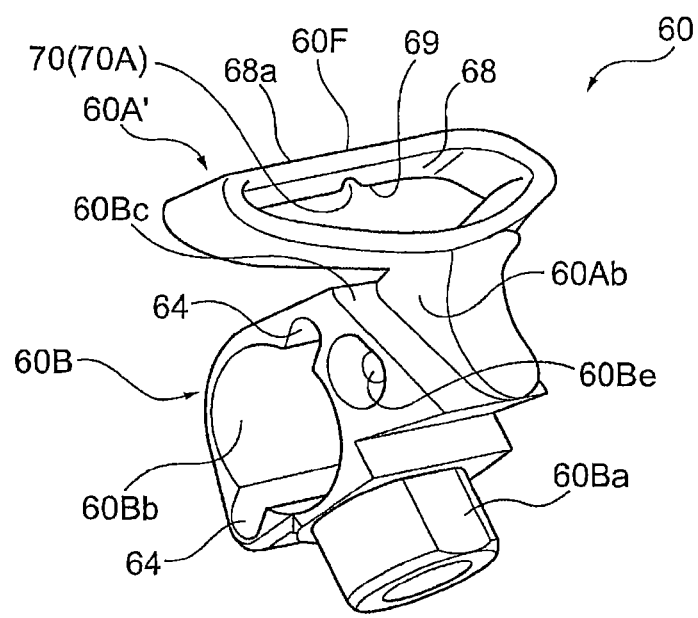
FIG. 12 is an enlarged perspective view of the fishing line guide body of the fishing reel of FIG. 11.
Figure 13:
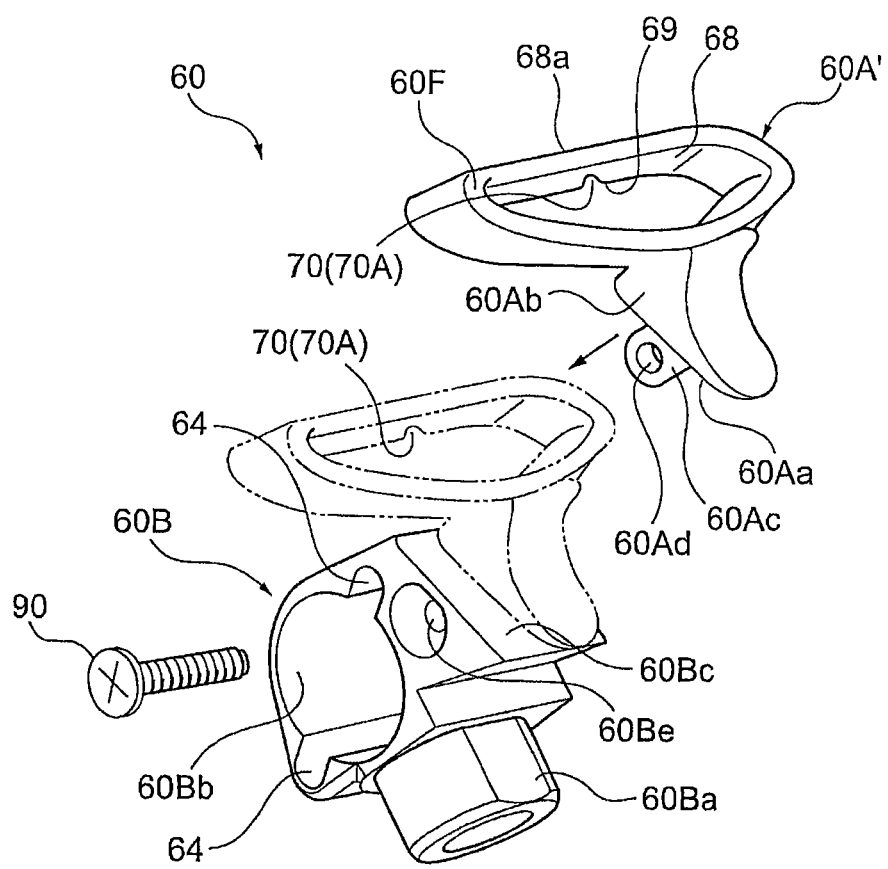
FIG. 13 is an exploded perspective view of the fishing line guide body illustrated in FIG. 12.
Figure 14:
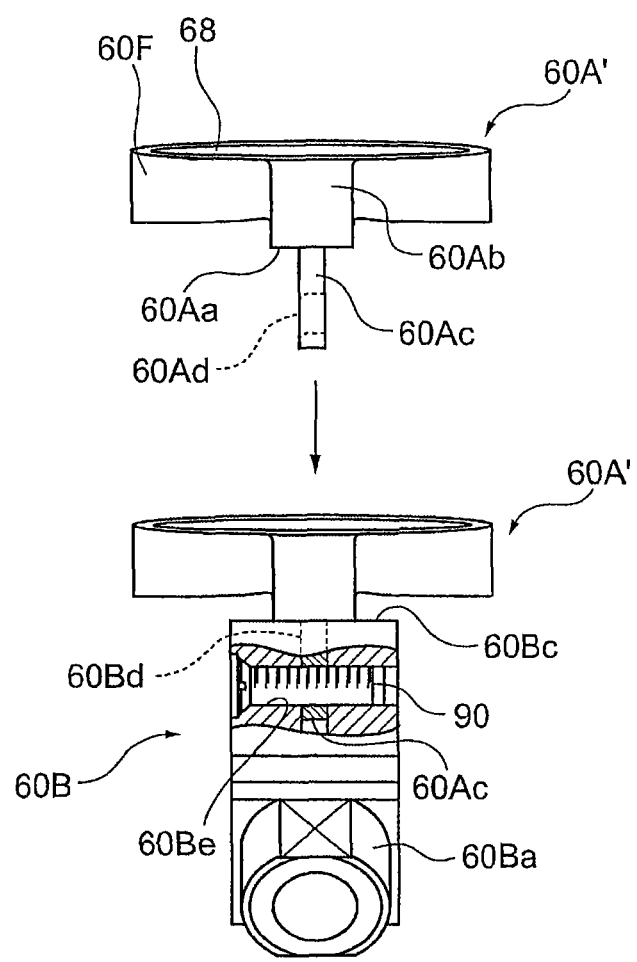
FIG. 14 is a front perspective view including a partial cross-section of the fishing line guide body illustrated in FIG. 12.

FIGS. 9A and 10B illustrate another modification of the fishing line guide section. A fishing line guide section 70A of this modification is also formed at a portion, which is close to the spool, of the upper wall 68a of the fishing line threading section 60A (a surface portion of the upper end portion of the frame body 60F facing the spool 5A), and is also formed so as to be narrower than the opening 65 of the fishing line threading section 60A. However, particularly, the fishing line guide section 70A of this modification is formed in the shape of a groove that includes an outer wide portion 91 and an inner (deep) narrow portion 90 communicating with the wide portion 91 as clearly illustrated in FIG. 9C.

Specifically, the groove-shaped fishing line guide section 70A includes an opening portion 85 that is opened at a rear end edge 69 of the upper wall 68a of the frame body 60F of the fishing line threading section 60A so as to have a predetermined width. The wide portion 91 is formed by tapered surfaces 83 and 83, and the tapered surfaces 83 and 83 extend in a tapered shape (are widened in a tapered shape toward the opening portion 85) so that a distance between the tapered surfaces 83 and 83 starts to be gradually reduced at the opening portion 85 as a starting point toward the opening 65 (inside) from both sides of the opening portion 85. Further, inner end portions of the tapered surfaces 83 and 83 are connected to the narrow portion 90 (holding groove) that has a small dimension corresponding to a circle having a diameter smaller than the width of the opening portion 85. Further, all of the wide portion 91 and the narrow portion 90 can hold the fishing line S, which is threaded through the opening 65 of the fishing line threading section 60A, in the left and right direction, and the wide portion 91 guides the fishing line S, which extends through the fishing line threading section 60A, to the narrow portion 90.

Accordingly, in the fishing line guide section 70A having the above-mentioned structure, since the fishing line guide body 60 is rotated rearward and the fishing line threading section 60A falls down during the winding of the fishing line, the fishing line guide section 70A comes into contact with the fishing line S that is threaded through the fishing line threading section 60A. In this case, the fishing line S can be selectively held by any one of the wide portion 91 and the narrow portion 90 in accordance with the diameter or the state of the fishing line S. That is, a fishing line portion S1 not accompanied by a knot and the like or a small-diameter fishing line S1 can be held and guided to the spool 5A by the narrow portion 90 (see FIGS. 9C and 10A). On the other hand, a fishing line portion S2 accompanied by a knot and the like or a large-diameter fishing line S2 can be held and guided to the spool 5A by the wide portion 91 (see FIGS. 9C and 10B). Alternatively, in other words, the fishing line S1 can be usually held and guided to the spool 5A well by the narrow portion 90. However, when the portion S2, which is accompanied by a knot and the like, of the fishing line S1 passes through the fishing line guide section 70A, the portion S2 is released to the wide portion 91 and the fishing line S1 can be guided to the spool 5A by the wide portion 91 (the fishing line S1 can smoothly pass through the fishing line guide section 70A without being caught regardless of whether or not a knot and the like are present). More specifically, immediately when the portion S2, which is accompanied by a knot and the like, of the fishing line S1 comes into contact with the narrow portion 90, the fishing line guide body 60 (the fishing line threading section 60A) slightly moves upward (moves upward by a distance X to a state illustrated by a solid line from a state illustrated by a dashed-dotted line in FIG. 10B) against a biasing force of the switching spring 23 (see FIGS. 2 and 3) of the clutch mechanism. Accordingly, the portion S2 is released to the wide portion 91 (the knot and the like are received in the wide portion 91), and the fishing line S1 is naturally guided to the spool 5A. Then, after the portion S2 passes through the wide portion 91, the fishing line S1 is guided to the spool 5A via the narrow portion 90 again.

Incidentally, the fishing line guide sections 70 and 70A having been described above have been described using the embodiment in which the height of the fishing line guide section in the vertical direction is larger than the width thereof in the left and right direction. However, likewise, the fishing line guide section 70 or 70A can be applied not only to the above-mentioned fishing line threading section 60A that forms the opening 65 elongated in the vertical direction but also to a fishing line threading section 60A that includes an opening 68 elongated in the left and right direction. Such an example is illustrated in FIGS. 11 to 14.

That is, as illustrated in FIGS. 11 to 14, a holding section 60B of a fishing line guide body 60 is integrally formed and made of a material, which allows weight to be reduced, for example, a resin material, and holds the slidable member 61 (see FIGS. 5 and 6 of the above-mentioned first embodiment) in a protruding portion 60Ba that is formed so as to protrude forward. As described above, the slidable member 61 is fixed to the holding section 60B by a cap nut 62 (see FIGS. 5 and 6) that is fitted to the protruding portion 60Ba. Further, an insertion hole 60Bb is formed at the holding section 60B, and the tubular body 55 (see FIGS. 5 and 6) is inserted into the insertion hole 60Bb (the above description is the same as the first embodiment).

A fishing line threading section 60A' of the fishing line guide body 60 is a portion through which the fishing line S to be unwound from the spool 5A is threaded, and is integrally formed as a frame body 60F made of a material having small resistance against a fishing line, such as SUS or titanium, as in the above-mentioned embodiment. Specifically, the fishing line threading section 60A' includes a wide opening 68 that expands in the left and right direction so as to be substantially symmetric.

The opening 68 is formed in a substantially oval shape expanding in the left and right direction in front view (front view seen from the front side along the fishing line S to be threaded) when the fishing line guide body is in the fishing line unwinding state.

The frame body 60F including the opening 68 is inclined with respect to the front and rear direction (in a shape in which the frame body gradually rises toward the rear side) in side view when the fishing line guide body is in the fishing line unwinding state, and an upper wall 68a forming the opening 68 is parallel to the front and rear direction in the fishing line unwinding state. Accordingly, it is possible to obtain an opening as large as possible. Further, the above-mentioned groove-shaped fishing line guide section 70 (or 70A) is formed at a rear end edge 69 of the upper wall 68a that forms the opening 68 and is parallel to the front and rear direction. The fishing line guide section 70 is positioned so as to come into contact with the fishing line S, which is threaded through the opening 68, from above when the fishing line guide body is rotated to the fishing line winding state from the fishing line unwinding state. Accordingly, the fishing line guide section 70 can guide the fishing line S to the spool 5A by coming into contact with the fishing line S.

As described above, the holding section 60B is integrally formed and made of a resin material or the like and is formed separately from the frame body 60F. That is, the frame body 60F (the fishing line threading section 60A') and the holding section 60B, which are made of different materials, of the fishing line guide body 60 are formed separately and integrated with each other. Accordingly, the fishing line guide body 60 is reduced in cost while being reduced in weight as a whole.

The holding section 60B and the fishing line threading section 60A' may be formed separately and integrated with each other (integrated with each other by adhesion or the like). However, the holding section 60B and the fishing line threading section 60A' are detachably integrated with each other in this embodiment. Specifically, a receiving portion 60Bc, which receives the frame body 60F, is formed at the holding section 60B, and a contact portion 60Aa (see FIG. 13), which is positioned by coming into contact with the receiving portion 60Bc, is formed at the fishing line threading section 60A' (the frame body 60F). In this case, the contact portion 60Aa is formed of a lower surface of the extension portion 60Ab that extends downward from a lower middle position of the opening 68, and the receiving portion 60Bc is formed of a surface that comes into contact with the lower surface. Accordingly, both the contact portion 60Aa and the receiving portion 60Bc are formed of flat surfaces that come into surface contact with each other. Further, a fitting hole 60Bd (see FIG. 14) is formed at the receiving portion 60Bc, and a fitting protrusion 60Ac (see FIGS. 13 and 14) to be fitted to the fitting hole 60Bd is formed at the contact portion 60Aa. Furthermore, a screw hole 60Be is formed at the holding section 60B so as to be parallel to the insertion hole 60Bb, and a screw hole 60Ad is formed at the fitting protrusion 60Ac so as to be coaxial with the screw hole 60Be when the fitting protrusion 60Ac is fitted to the fitting hole 60Bd.

Accordingly, when a fixing member (screw) 90 is tightened while the fitting protrusion 60Ac of the fishing line threading section 60A' is fitted to the fitting hole 60Bd of the holding section 60B (see FIGS. 13 and 14) and the contact portion 60Aa and the receiving portion 60Bc are positioned by coming into contact with each other, the fishing line threading section 60A' and the holding section 60B are detachably integrated with each other. That is, the fishing line threading section 60A' can be easily mounted on and detached from the holding section 60B.

Even though the fishing line guide section 70 or 70A is applied to the fishing line threading section 60A that includes the opening 68 elongated in the left and right direction as described above, the same function and the effect as the above-mentioned embodiment can be obtained as the regulation of the fishing line.

Meanwhile, the invention is not limited to the above-mentioned embodiment, the above-mentioned modifications, and the like, and may have various modifications without departing from the scope of the invention. For example, the shape of the fishing line guide body 60 can be appropriately changed. Further, the fishing line guide body 60 is adapted to rotate in conjunction with the clutch mechanism 20 in the above-mentioned embodiment, but may not be in conjunction with the clutch mechanism. Furthermore, the protrusions extending in the axial direction are formed on the outer periphery of the tubular body 55 to stop rotation when the fishing line guide body 60 is rotated. However, rotation may be stopped by edges of a long hole 55a formed at the tubular body 55. Moreover, the shape of the fishing line guide section 70 may be any shape as long as the fishing line guide section can stably hold the fishing line in the left and right direction. Further, the fishing line threading section 60A may be adapted to be detachably mounted on the holding section 60B by a screw or the like so that the unwinding and winding of the fishing line are finely adjusted or maintenance is improved.

EXPLANATIONS OF LETTERS OR NUMERALS

1: reel body
1A, 1B: left and right side plates
5: spool shaft
5A: spool
8: handle
20: clutch mechanism
50: level wind device
60: fishing line guide body
60A: fishing line threading section
65, 68: opening
70, 70A: fishing line guide section
72: tapered surface
74: holding groove
90: narrow portion
91: wide portion

The invention claimed is:

1. A fishing reel comprising:
a spool that is rotatably supported between left and right side plates of a reel body; and
a level wind device including a fishing line guide body through which a fishing line unreeled from the spool is threaded and which reciprocates between the left and right side plates in front of the spool in conjunction with the rotation of a handle,
wherein the fishing line guide body includes a fishing line threading section that forms an elongated opening of which a height in a vertical direction is larger than a width in a left and right direction,
a fishing line guide section, which is formed so as to be narrower than the fishing line threading section and guides the fishing line to the spool by coming into contact with the fishing line, is provided at a portion, which is close to the spool, of an upper wall of the fishing line threading section,
the fishing line guide body is adapted to be rotatable in a front and rear direction,
the fishing line guide body is rotated forward and the fishing line threading section stands up in the vertical direction during the unwinding of the fishing line, and
the fishing line guide body is rotated rearward and the fishing line threading section falls down during the winding of the fishing line, so that the fishing line guide section comes into contact with the fishing line threaded through the fishing line threading section.

2. The fishing reel according to claim 1,
wherein the fishing line guide section includes a holding groove that holds the fishing line threaded through the fishing line threading section in the left and right direction, and tapered surfaces that guide the fishing line extending through the fishing line threading section to the holding groove.

3. The fishing reel according to claim 2,
wherein the fishing line guide body is rotated in the front and rear direction in conjunction with an ON/OFF operation of a clutch mechanism.

4. The fishing reel according to claim 1,
wherein the fishing line guide section is formed in the shape of a groove that includes an outer wide portion having a tapered shape and an inner narrow portion communicating with the wide portion.

5. The fishing reel according to claim 4,
wherein the fishing line guide body is rotated in the front and rear direction in conjunction with an ON/OFF operation of a clutch mechanism.

6. The fishing reel according to claim 1,
wherein the fishing line guide body is rotated in the front and rear direction in conjunction with an ON/OFF operation of a clutch mechanism.

7. A fishing reel comprising:
a spool that is rotatably supported between left and right side plates of a reel body; and
a level wind device including a fishing line guide body through which a fishing line unreeled from the spool is threaded and which reciprocates between the left and right side plates in front of the spool in conjunction with the rotation of a handle,
wherein the fishing line guide body includes a fishing line threading section that forms a wide opening that expands in a left and right direction,
a fishing line guide section, which is formed so as to be narrower than the fishing line threading section and guides the fishing line to the spool by coming into contact with the fishing line, is provided at a portion, which is close to the spool, of an upper wall of the fishing line threading section,
the fishing line guide body is adapted to be rotatable in a front and rear direction,
the fishing line guide body is rotated forward and the fishing line threading section stands up in the vertical direction during the unwinding of the fishing line, and
the fishing line guide body is rotated rearward and the fishing line threading section falls down during the winding of the fishing line, so that the fishing line guide section comes into contact with the fishing line threaded through the fishing line threading section.

* * * * *